Patented Dec. 28, 1926.

1,612,669

UNITED STATES PATENT OFFICE.

ROBERT H. VAN SCHAACK, JR., OF EVANSTON, ILLINOIS.

CELLULOSE-ESTER COMPOSITION.

No Drawing.  Application filed August 21, 1925. Serial No. 51,688.

My invention relates to a new and useful composition comprising a cellulose ester and an ester containing benzyl or an allied radical. An example is a composition comprising nitrocellulose and benzyl lactate. Other purposes of the invention will appear from the following description.

Benzyl acetate and benzyl benzoate have already been disclosed as ingredients of cellulose ester compositions. Such compounds of the benzyl radical are less volatile than the corresponding ethyl compounds and are preferable, in that respect, for those uses requiring a nearly non-volatile solvent.

I have now discovered that I can produce nitrocellulose or cellulose acetate compositions with benzyl lactate or other allied esters of hydroxy aliphatic acids. Such an ester dissolves the usual grades of nitrocellulose or cellulose acetate. Also benzyl lacetate, containing an hydroxyl group, has certain properties of an alcohol. Benzyl lactate is, therefore, an excellent blending agent for cellulose esters and certain alcohol-soluble resins.

An example of my composition is this lacquer:

10 lbs. nitrocellulose,
 5 lbs. shellac,
 5 lbs. benzyl lactate,
 20 lbs. denatured alcohol,
 20 lbs. ethyl acetate,
 20 lbs. butyl alcohol,
 20 lbs. butyl acetate,
 10 lbs. toluol.

Pigments, resins, and other ingredients common to lacquer manufacture may be added. Also, the nature and amount of solvents which are readily volatilized from the lacquer film may be varied over wide ranges. Likewise, the proportion of benzyl lactate itself may be varied to produce lacquers suitable for use under diverse atmospheric conditions, lacquers giving residual films of greater or less softness, or lacquers to meet other special requirements.

My composition may be used also in the manufacture of celluloid.

While the method of preparing benzyl lactate is disclaimed as no part of my invention, yet the method may be of interest. Benzyl chloride is refluxed with an aqueous or alcoholic solution of sodium lactate. The resulting benzyl lactate is purified by any one of several procedures.

As stated, my invention includes not only nitrocellulose but also cellulose acetate compositions with benzyl lactate. Also, my invention includes compositions of such cellulosic compounds with the substitution products, homologs, or isomers of benzyl lactate or with the corresponding esters of any other mono-, di-, or tri-hydroxy aliphatic acid. Classes of compounds within the scope of my invention for use in conjunction with cellulose esters, are illustrated by the following type compounds.

Benzyl ester of a hydroxy, monocarboxylic aliphatic acid, such as

benzyl lactate.

Benzyl ester of a hydroxy dicarboxylic aliphatic acid, such as

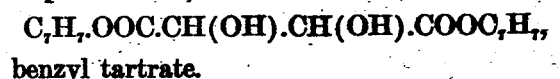

benzyl tartrate.

Benzyl ester of a hydroxy tricarboxylic aliphatic acid, such as

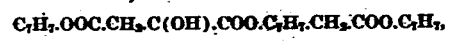

benzyl citrate.

Substituted benzyl esters of hydroxy aliphatic acids, mono-, di-, or tri-carboxylic, such as

methyl benzyl lactate.

$CH_3.CH(OH).COO(CL.C_7H_6)$, chlorbenzyl lactate.

Isomers of benzyl esters, such as

in which R represents the radical of any hydroxy aliphatic acid, as in the compound

tolyl ricinoleate.

I disclaim as no part of my invention compositions of cellulose esters with benzyl esters of non-hydroxy aliphatic acids.

I claim:—

1. A composition of matter comprising a cellulose ester and a benzyl ester of a hydroxy fatty acid.

2. A composition of matter comprising nitrocellulose and a benzyl ester of a hydroxy fatty acid.

3. A composition of matter comprising a cellulose ester and a benzyl ester of a monohydroxy fatty acid.

4. A composition of matter comprising nitrocellulose and a benzyl ester of a hydroxy monocarboxylic aliphatic acid.

5. A composition of matter comprising a cellulose ester and an aryl-alkyl ester of a hydroxy aliphatic acid.

6. A composition of matter comprising nitrocellulose and an aryl-alkyl ester of a hydroxy aliphatic acid.

7. A composition of matter comprising a cellulose ester and an aryl-alkyl ester of a hydroxy monocarboxylic aliphatic acid.

8. A composition of matter comprising nitrocellulose and an aryl-alkyl ester of hydroxy monocarboxylic aliphatic acid.

9. A composition of matter comprising a cellulose ester and benzyl lactate.

10. A composition of matter comprising nitrocellulose and benzyl lactate.

11. A fluid composition of matter adapted for use as a lacquer containing a cellulose ester and a benzyl ester of a hydroxy aliphatic acid.

12. A fluid composition of matter adapted for use as a lacquer containing nitrocellulose and a benzyl ester of a hydroxy aliphatic acid.

13. A fluid composition of matter adapted for use as a lacquer containing a cellulose ester and benzyl lactate.

14. A fluid composition of matter adapted for use as a lacquer containing nitrocellulose and benzyl lactate.

15. A lacquer comprising 10 lbs. nitrocellulose, 5 lbs. shellac, and 5 lbs. benzyl lactate, dissolved in a solvent mixture containing 20 lbs. denatured ethyl alcohol, 20 lbs. ethyl acetate, 20 lbs. butyl alcohol, 20 lbs. butyl acetate, 10 lbs. toluol, with pigment to color as desired.

In testimony, that I claim the foregoing as my own, I have hereto affixed my signature.

R. H. VAN SCHAACK, Jr.